(12) United States Patent
Chang et al.

(10) Patent No.: US 8,587,646 B2
(45) Date of Patent: Nov. 19, 2013

(54) MULTI-LENS MONITORING SYSTEM FOR BED ELEVATION AROUND A PIER

(75) Inventors: Wen-Yi Chang, Hsinchu (TW); Teng-Yi Yu, Hsinchu (TW); Jihn-Sung Lai, Hsinchu (TW); Whey-Fone Tsai, Hsinchu (TW); Franco Lin, Hsinchu (TW); Lung-Cheng Lee, Hsinchu (TW); Yu-Hui Liao, Hsinchu (TW); Ho-Cheng Lien, Hsinchu (TW); Chin-Hsiung Loh, Taipei (TW)

(73) Assignee: National Applied Research Laboratories, Hsinchu (TW)

( * ) Notice: Subject to any disclaimer, the term of this patent is extended or adjusted under 35 U.S.C. 154(b) by 682 days.

(21) Appl. No.: 12/833,256

(22) Filed: Jul. 9, 2010

(65) Prior Publication Data

US 2011/0242309 A1 Oct. 6, 2011

(30) Foreign Application Priority Data

Apr. 6, 2010 (TW) ................................ 99110547 A (51) Int. Cl.
*H04N 9/47* (2006.01)
*H04N 7/18* (2006.01)

(52) U.S. Cl.
USPC .......................................................... 348/81

(58) Field of Classification Search
USPC ............................... 348/81–85, 135, 159, 161
See application file for complete search history.

(56) References Cited

U.S. PATENT DOCUMENTS

| | | | | |
|---|---|---|---|---|
| 3,500,648 A | * | 3/1970 | Daniell | 405/192 |
| 5,349,327 A | * | 9/1994 | Waters | 340/540 |
| 7,457,196 B2 | * | 11/2008 | Acker et al. | 367/88 |
| 8,169,477 B2 | * | 5/2012 | Tawfiq et al. | 348/85 |
| 2008/0257140 A1 | * | 10/2008 | Blohm et al. | 89/1.13 |
| 2009/0162146 A1 | * | 6/2009 | Bastard et al. | 405/166 |
| 2009/0314149 A1 | * | 12/2009 | Clark, II | 83/651.1 |
| 2011/0128349 A1 | * | 6/2011 | Theobald | 348/36 |

* cited by examiner

*Primary Examiner* — Nhon Diep
(74) *Attorney, Agent, or Firm* — Rosenberg, Klein & Lee (57) ABSTRACT

The present invention relates to a multi-lens monitoring system for bed elevation around a pier according to the present invention comprises a container, a holder, a plurality of photographing units, and a processing module. The container is disposed on the pier; the holder is disposed inside the container; and the plurality of photographing units are disposed on the holder for photographing the bed under water and producing a monitoring image. The processing module is used for activating one of the plurality of photographing units for photographing the bed under water. The processing module also analyzes the monitoring image, gives the elevation variation of the bed, and transmits the elevation variation of the bed to a remote monitoring unit for real-timely monitoring and recording. During the monitoring process, the processing module will change activating one of the plurality of photographing units according to the monitoring image, and hence the electrical power can be saved.

12 Claims, 5 Drawing Sheets

MULTI-LENS MONITORING SYSTEM FOR BED ELEVATION AROUND A PIER

FIELD OF THE INVENTION

The present invention relates generally to a monitoring system for bed elevation around a pier, and particularly to a multi-lens monitoring system for bed elevation around a pier.

BACKGROUND OF THE INVENTION

In recent years, wind and flood disasters occur frequently worldwide. The disasters usually swell rivers and creeks, making the foundations of bridge piers be scoured severely and thus exposing the piles of the piers. Consequently, the lateral resistance of a bridge is deficient, which results in tilt or break of the bridge. If the floods are heavy, the piers will be broken directly, and hence collapsing the bridge in a sudden and endangering traffic safety. The situation not only results in traffic breakdown, but also brings a great loss of civilian lives, public properties, and local constructions in a short time. Presently, in order to understand the scouring condition of the bed around a pier and thereby launching immediate early warnings, a monitoring system is developed. Accordingly, the traffic safety can be assured; the secondary injuries owing to bridge break can be avoided; and the lifetime of the bridges can be extended by timely reinforcement and repair. Furthermore, the monitoring data can be recorded in the long term for establishing complete database of pier scouring, which can be used for pier protection and bed remediation in the future.

Currently, the mostly adopted monitoring methods among many related techniques for monitoring pier scouring are described as follows.

Ground-penetrating radar method: This is a non-destructive inspecting technique, which uses high-frequency electromagnetic wave source to transmit radar wave for penetrating various material layers and deducing the elevation variations of the bed. The advantage of the present method is that the elevation variation of the bed can be recorded continuously; while the drawbacks thereof are that the operation is time-consuming and that the professional training is required for operation.

Numbered bricks method: This method uses a brick array composed of a plurality of bricks with fixed size. Each of the bricks is numbered sequentially and marked, and is buried under the bed upstream to the bridge pier. When the floods come, the elevation variations of the bed can be approximated by measuring the displacement and amount of bricks scoured from their original locations. The drawbacks of the present method include the need of digging out the bed and single use only. Besides, only the scoured depth can be measured while the silt depth is not available.

Sliding magnetic collar method: A hollow sliding shaft with an external collar is disposed on the surface of the pier post. When the bed is scoured, the collar will move downward, providing the scouring depth of the specific location. A magnetic sensor is disposed inside the sliding shaft. The magnetic sensor can move synchronously to the external collar and transmit the moving signal outside by using a circuit. The drawback of the present method is that only the scoured depth can be recorded while the silt depth is not available.

Water-level identification using outdoor monitoring lenses: This method extracts the image of the water level under test using an image extraction apparatus. The extracted image is conducted by a series of image process to give the elevation of the water surface. However, the present method cannot monitor pier scouring.

Self-moving lens monitoring method: This method is the Taiwan invention application number 098131157 by the present applicants. According to the method, a hollow container is buried in the bed beside the pier and fixed on the pier. The container includes a photographing apparatus disposed on a carrier for monitoring. A motor is used for controlling vertical movement of the carrier for monitoring the scouring condition of the sand surface. When the sand surface is raised by silting or lowered by scouring, the real-time image identification system can be used for tracking the sand surface. Thereby, both silting and scouring can be detected. The drawbacks of the method include huge power consumption used for controlling the movement of the carrier. In addition, because data are transmitted wirelessly, the transmission quality tends to be interfered by the motor.

Gravity-type scour measurement apparatus: When the sand surface is lowered by scouring, the detector will also sink lower owing to the gravity effect. Thereby the scouring depth can be given by reading the lowered height. The drawback of the apparatus is that only scouring can be detected. Silting cannot be measured.

Radio-transmitter-type scour monitoring system for soil layers: Multiple radio transmitters are buried in the soil layers. When the sand surface is scoured to a certain depth, the radio transmitter will be move or vibrated. Thereby, the scoring condition of the sand surface can be detected. The system's drawback is that only scouring can be detected. Silting cannot be measured.

Optical-fiber sensing system: This is a measurement system using optical-fiber gratings for monitoring. Because a medium attached to the optical fiber changes the internal refractivity of the optical fiber and shifts the wavelength of the internal light, the depth of the medium can be located and deduced. The drawback of the system is that the fragile optical fiber has to be attached directly to water or sand surface, and hence the optical fiber tends to be damaged.

According to the monitoring methods mostly adopted currently as described above, it is known that how to monitor the scouring condition of the bed around a pier in a better method for extending the lifetime of a bridge is a major subject at present.

Accordingly, the present invention provides a multi-lens monitoring system for bed elevation around a pier, which can solve the drawbacks according to the prior art and can real-timely monitor the elevation variations of the bed around the pier.

SUMMARY

An objective of the present invention is to provide a multi-lens monitoring system for bed elevation around a pier, which has a container disposed on the pier and a plurality of photographing units disposed in the container. A processing module activates one of the plurality of photographing units for photographing the bed under water and producing a monitoring image. The processing module then analyzes the monitoring image immediately, gives the elevation variation of the bed, and transmits the elevation variation of the bed to a remote monitoring unit for real-timely monitoring and recording. Thereby, the purpose of reducing the amount of transmitted data can be achieved, and hence reducing the required transmission bandwidth.

Another objective of the present invention is to provide a multi-lens monitoring system for bed elevation around a pier, which only activates a photographing unit for photographing the bed under water. Because the photographing unit needs not to be moved, the purpose of saving power can be achieved.

Still another objective of the present invention is to provide a multi-lens monitoring system for bed elevation around a pier, which uses a processing module to switch activating the plurality of photographing units automatically according to the monitoring images extracted by the photographing units without the need of manual operations. Thereby, the manpower costs can be saved and the monitoring convenience can be enhanced.

The multi-lens monitoring system for bed elevation around a pier according to the present invention comprises a container, a holder, a plurality of photographing units, and a processing module. The container is disposed on the pier; the holder is disposed inside the container; and the plurality of photographing units are disposed on the holder for photographing the bed under water and producing a monitoring image. The processing module is used for activating one of the plurality of photographing units for photographing the bed under water. The processing module also analyzes the monitoring image, gives the elevation variation of the bed, and transmits the elevation variation of the bed to a remote monitoring unit for real-timely monitoring and recording. During the monitoring process, the processing module will change activating one of the plurality of photographing units and select the photographing unit at the proper location for photographing the bed under water. Because the processing module activates a single photographing unit for photographing the bed without the need of moving the photographing units, the electrical power can be saved. In addition, the multi-lens monitoring system for bed elevation around a pier according to the present invention further comprises a power supply for supplying power to the plurality of photographing units and the processing unit.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
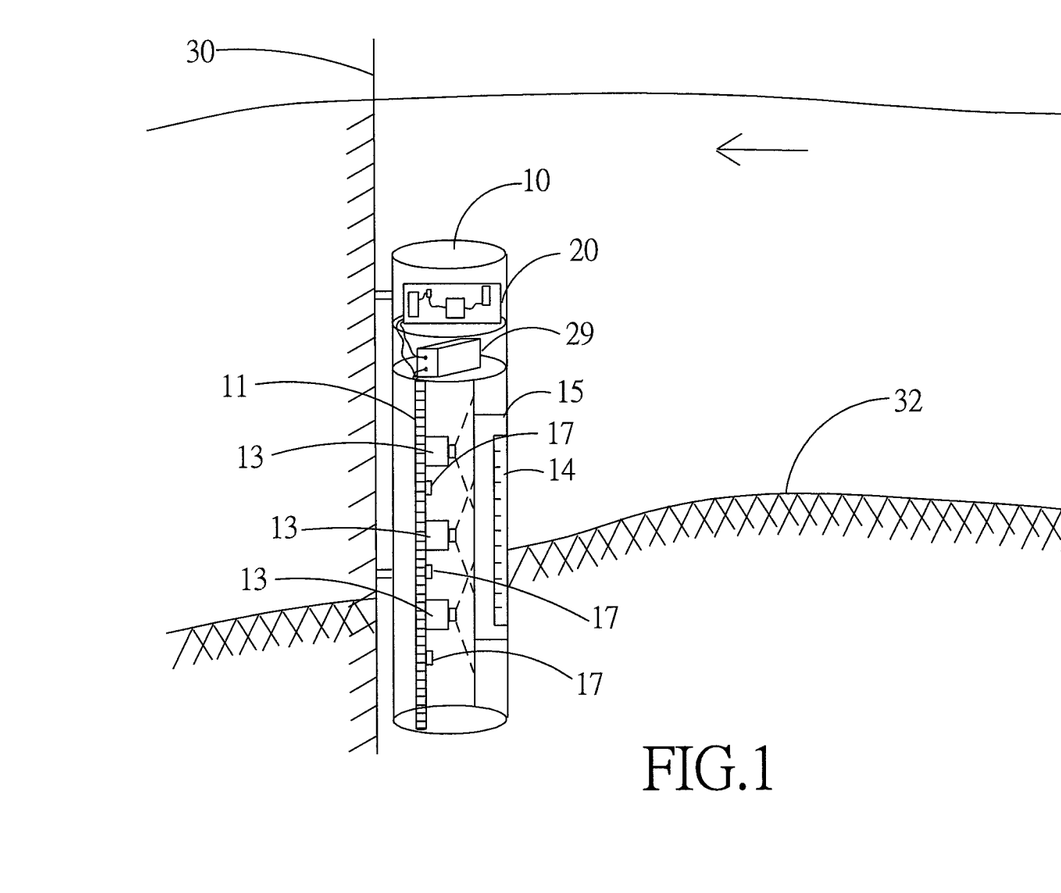
FIG. 1 shows a structural schematic diagram of the multi-lens monitoring system for bed elevation around a pier disposed on the pier according to a preferred embodiment of the present invention.

FIG. 1 shows a structural schematic diagram of the multi-lens monitoring system for bed elevation around a pier disposed on the pier according to a preferred embodiment of the present invention. As shown in the figure, the multi-lens monitoring system for bed elevation around a pier according to the present invention is disposed on a pier 30, and is used for monitoring the elevation variations of the bed 32 under water. The monitoring system according to the present invention comprises a container 10, a holder 11, a plurality of photographing units 13, and a processing module 20. The container 10 is disposed on the pier 30 by means of any methods according to the prior art. The container 10 is hermetical, and the material thereof is waterproof and impact enduring, such as steel, for avoiding water from entering the container 10 and for preventing damages due to impact by external objects. Thus, the equipment therein can be protected. According to a preferred embodiment of the present invention, the container 10 a hollow long cylindrical tube with a streamline shape for reducing its influence on water flow field.

As shown in FIG. 1, the container 10 has the holder 11 inside. The plurality of photographing units 13 are disposed on the holder 11, respectively, with intervals therebetween. The plurality of photographing units 13 are used for photographing the bed 32 under water, and producing a monitoring image and transmitting the monitoring image to the processing module 20. The processing module 20 analyzes the monitoring image for giving the elevation variations of the bed 32. Thereby, whether the elevation of the bed 32 is increased caused by sand silting or is lowered due to scouring will be known. The processing module 20 is further used for controlling, namely, activating or turning off, the plurality of photographing units 13. The processing module 20 according to the present invention chooses to activate one of the plurality of photographing units 13 according to the current elevation of the bed 32 to photograph the bed 32 under water and produce the monitoring image. The other photographing units 13 remain off. Because the processing module 20 can activate a single photographing unit 13 without moving the photographing unit 13, the power can be saved. A preferred embodiment of the photographing unit 13 described above can be a charge-coupled device (CCD) or a photographing instrument of other type. The detailed method by which the processing module 20 controls the plurality of photographing units 13 will be described later.

In addition, the multi-lens monitoring system according to the present invention further comprises a transparent window 15 disposed on the surface of the container 10 facing the water. The plurality of photographing units 13 are arranged from top to bottom, and photograph the bed 32 under water through the transparent window 15 for producing the monitoring image. Besides, the container 10 further has a scale 14 disposed in the container 10 and on the transparent window 15. Thereby, when the photographing units 13 photograph the bed 32 under water, the graduations of the scale 14 are photographed as well. Accordingly, the processing module 20 analyzes the monitoring image and gives the current elevation of the bed 32. The multi-lens monitoring system according to the present invention further comprises at least a lighting unit 17 disposed on the holder 11 and preferably disposed between two photographing units 13. The lighting unit 17 is used for providing the light needed when the photographing units photograph.

Refer again to FIG. 1. The container 10 further has a power supply 29 used for providing power required by the internal instruments, such as the photographing units 13, the processing module 20, and the lighting unit 17, of the monitoring system according to the present invention. A preferred embodiment of the power supply 29 described above is a battery or a solar cell. The method by which the power supply 29 according to the present invention supplies power can be the timer method or the continuous method. The timer method sets time by a general circuit and controls the time the power supply 29 supplies power to the instruments. However, the power supply 29 will maintain supplying power to the processing module 20 for keeping operations of the monitoring system. Thereby, the power can be saved and the time the power supply 29 can supply power is increased. If the continuous method is adopted, the power supply 29 supplies power uninterruptedly for monitoring the elevation variations of the bed 32 all the time. Accordingly, the power supply 29 can adopt solar cells.

Figure 2:
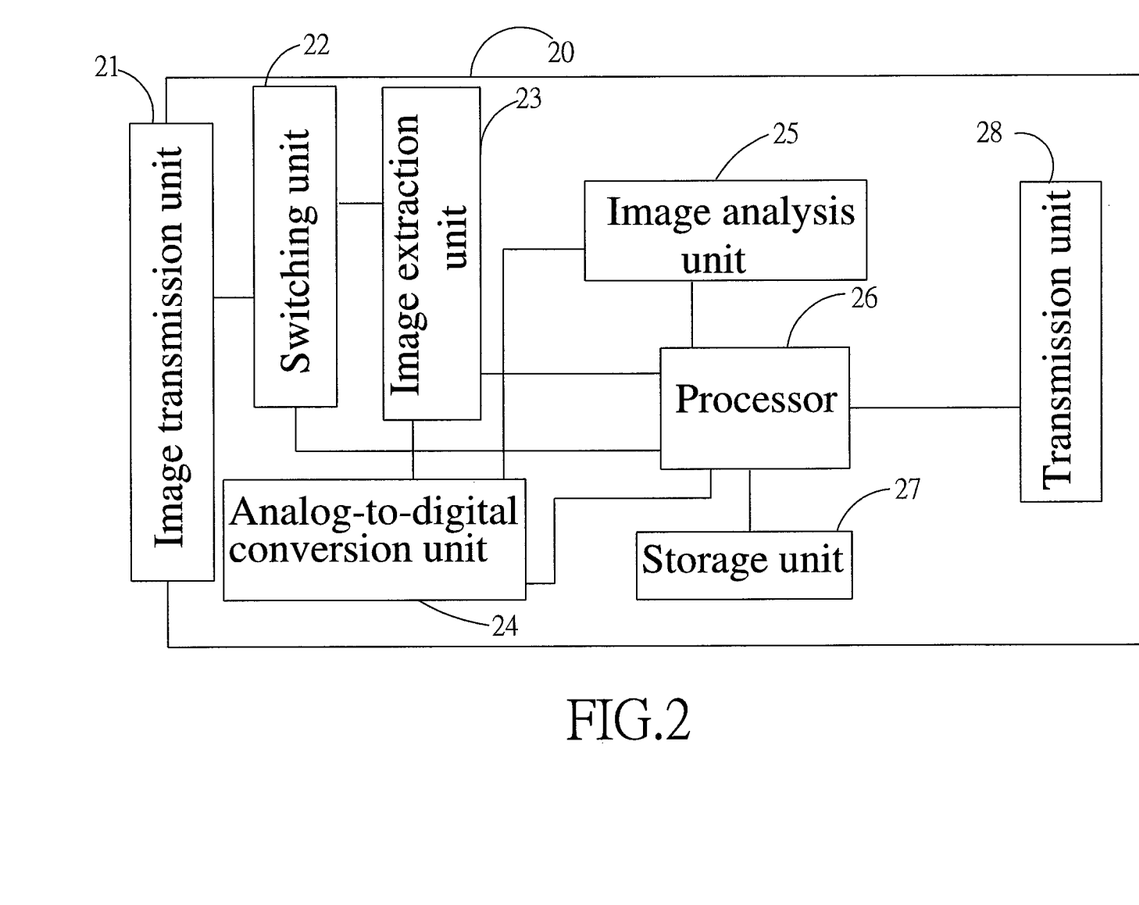
FIG. 2 shows a block diagram of the processing module according to a preferred embodiment of the present invention.

FIG. 2 shows a block diagram of the processing module according to a preferred embodiment of the present invention. As shown in the figure, the processing module 20 according to the present invention further comprises an image transmission unit 21, a switching unit 22, an image extraction unit 23, an analog-to-digital conversion unit 24, an image analysis unit 25, a processor 26, a storage unit 27, and a transmission unit 28. The image transmission unit 21 is connected to the plurality of photographing units 13, and is an image transmission interface used for transmitting the monitoring image of the photographing units 13. The switching unit 22 is coupled to the image transmission unit 21 and the processor 26. The switching unit 22 receives a switching signal produced by the processor 26, and switches the plurality of photographing units 13 via the image transmission unit 21 according to the switching signal. In other words, the switching unit 22 activates one of the plurality of the photographing units 13 according to the switching signal, and shutting off the others. Only a single photographing unit 13 photographs the bed 32 under water.

The image extraction unit 23 is coupled to the switching unit 22 for extracting the monitoring image transmitted by the image transmission unit 21 via the switching unit 22. The extracted monitoring image is transmitted to the analog-to-digital conversion unit 24 for digitizing the monitoring image and producing a digital image, which is further transmitted to the image analysis unit 25. The image analysis unit 25 is used for analyzing the digital image for giving the elevation of the bed 32 under water. The technology by which the image analysis unit 25 analyzes images can be any of currently available technologies. For example, because the container 10 according to the present invention has the scale 14, the monitoring image produced by the photographing unit 13 will have the graduations of the scale 14. The image analysis unit 25 can analyze the image and give the corresponding graduations of the bed 32 in the image. Thereby, the current elevation of the bed 32 is given.

In addition, after the image analysis unit 25 analyzes the image, the location of the interface between the bed 32 and the water in the monitoring image, for example, at the ⅔ position in height of the monitoring image. Because the height of the monitoring image and the location of the photographing units 13 are fixed, the actual height of the bed 32 can be deduced according to the location of the interface between the bed 32 and the water in the monitoring image. According to the description above, the scale 14 is not required for analyzing the image and giving the current elevation of the bed 32.

Referring again to FIG. 2, the image analysis unit 25 is further coupled to the processor 26 for transmitting the bed elevation to the processor 26, which calculates and gives the elevation variation of the bed 32 according to an original elevation of the bed 32 and the bed elevation given the image analysis unit 25. The transmission unit 28 is coupled to the processor 26 for receiving the elevation variation calculated by the processor 26 and transmitting the elevation variation to the remote monitoring unit 55 (referring to FIG. 5). Thereby, the monitoring personnel can monitor the elevation variations of the bed 32 real-timely, and record in the long term for future tracking. According the present invention, because the acquired data are processed in the processing module 20 and the transmission unit 28 only transmits the data of elevation variations of the bed 32 to the external remote monitoring unit 55, only a narrow bandwidth is required for completing transmission. A preferred embodiment of the transmission unit 28 according to the present invention can be wired transmission or wireless transmission. A preferred embodiment of the remote monitoring unit 55 is a computer.

Moreover, the processor 26 is further coupled to the image extraction unit 23 and the analog-to-digital conversion unit 24 for controlling the image extraction unit 23 and the analog-to-digital conversion unit 24. The processor 24 is further coupled to the storage unit 27, which stores system software for the processor 26. Besides, the processor 26 can activate a proper photographing unit 13 according to the current elevation of the bed 32 and the photographing range of each photographing unit 13. If the current elevation of the bed 32 is about to exceed the photographing range of the currently operating photographing unit 13, the currently operating photographing unit 13 will be shut off and another photographing unit 13 will be activated.

Figure 3:
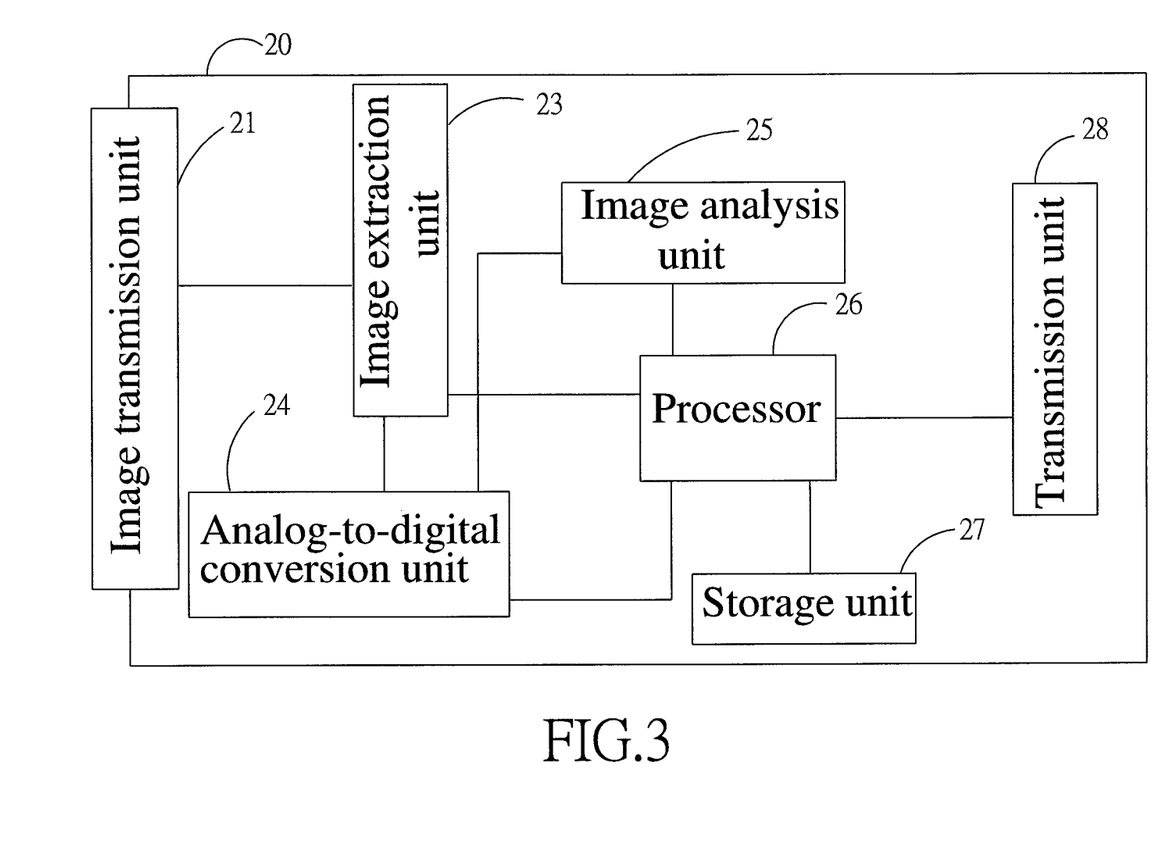
FIG. 3 shows a block diagram of the processing module according to another preferred embodiment of the present invention.

FIG. 3 shows a block diagram of the processing module according to another preferred embodiment of the present invention. As shown in the figure, the difference between the present preferred embodiment and the previous one is that the processing module 20 according to the present preferred embodiment does not include the switching unit 22 shown in FIG. 2. The processor 26 of the processing module 20 according to the present preferred embodiment is coupled directly to the plurality of photographing units 13 shown in FIG. 1 and controls the plurality of photographing units 13 directly but not via the switching unit 22 shown in FIG. 2. In addition, the image extraction unit 23 is coupled to the image transmission unit 21 for extracting the monitoring image transmitted by the image transmission unit 21.

Figure 4:
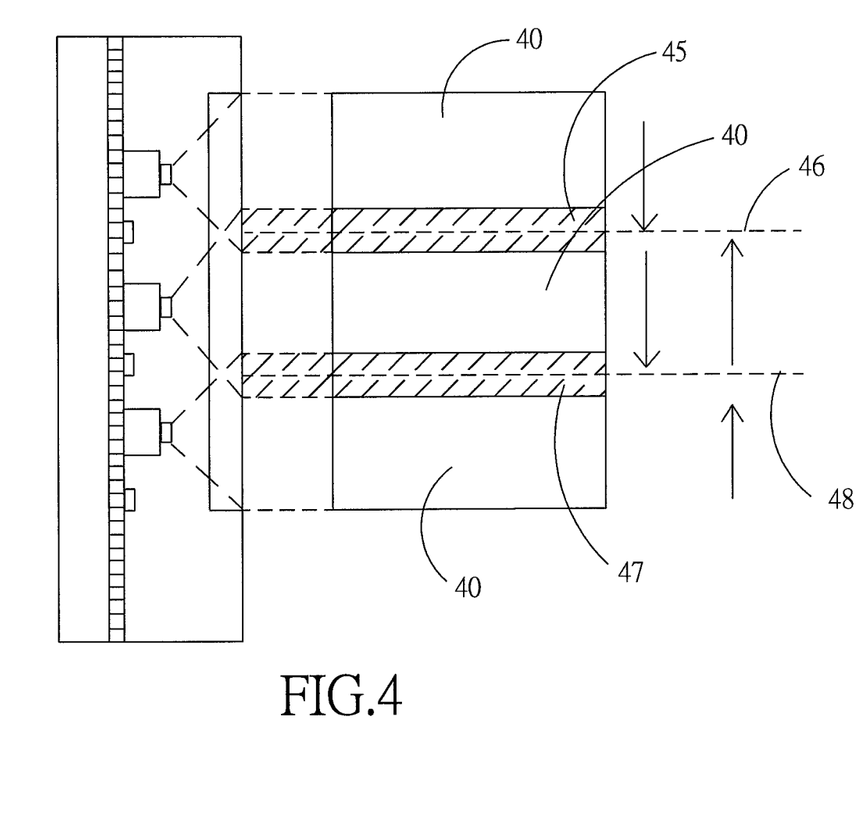
FIG. 4 shows a schematic diagram of the processing module switching the photographing units according to a preferred embodiment of the present invention.

FIG. 4 shows a schematic diagram of the processing module switching the photographing units according to a preferred embodiment of the present invention. As shown in the figure, each of the top-down arranged plurality of photographing units 13 has a photographing range 40, respectively. Adjacent photographing ranges 40 overlap, which means that parts of the monitoring images for the bed 32 produced by adjacent photographing units 13 overlap. Taking the present preferred embodiment as an example, the borders of the two monitoring images produced by the top photographing unit 13 and the middle photographing unit 13 overlap and an image-overlapping region 45 is produced. Likewise, the borders of the two monitoring images produced by the middle photographing unit 13 and the bottom photographing unit 13 overlap and an image-overlapping region 47 is produced. Because the borders of the monitoring images produced by two photographing units 13 overlap, it is guaranteed that all regions are photographed by the plurality of photographing units 13.

The processing module 20 according to the present invention gives the current elevation of the bed 32 shown in FIG. 1 according to the monitoring image. The processing module 20 also judges if to switch the plurality of photographing units 13 according to the current elevation of the bed 32 and the photographing range 40 of each photographing unit 13. Namely, the processing module 20 judges whether to shut off the currently operating photographing unit 13 and to activate another one. The processing module 20 according to the present invention uses the processor 26 (referring to FIG. 2 or FIG. 3) to judge if the current elevation of the bed 32 is on the switching location according to the current elevation of the bed 32. If yes, the currently operating photographing unit 13 is shut off and the photographing unit 13 adjacent to the currently operating photographing unit 13 is activated. According to the present preferred embodiment, the half locations of the image-overlapping regions 45, 47 are used as the switching locations, which are represented by switching lines 46, 48. In the following, when the processing module 20 switches the plurality of photographing units 13 will be described using an example.

Assume that the currently operating photographing unit the top photographing unit 13 and that the processing module 20 knows the current elevation of the bed 32 is lowered to the switching line 46. Then the processor 26 of the processing module 20 will shut off the top photographing unit 13 and activate the middle photographing unit 13. In the future, if the bed 32 is scoured by water and hence the elevation of the bed 32 is further lowered to the switching line 48, the processor 26 will shut off the middle photographing unit 13 and activate the bottom photographing unit 13. On the other hand, if sand silts up the bed 32 and the elevation of the bed 32 is raised to the switching line 48, the processor will shut off the bottom photographing unit 13 and activate the middle photographing unit 13. Likewise, if the elevation of the bed 32 is raised to the switching line 46, the processor will shut off the middle photographing unit 13 and activate the top photographing unit 13.

It is known from the above that if the elevation of the bed 32 falls within the photographing range 40 of some photographing unit 13 but not reaching the image-overlapping region 45 or the image-overlapping region 47, only this photographing unit 13 is activated for photographing the bed 32. Once the elevation of the bed 32 touches the switching line 46 or the switching line 48 of the image-overlapping region 45 or the image-overlapping region 47, the processor 26 will switch automatically to the adjacent photographing unit 13 for continuing photographing the bed 32. Meanwhile, the originally operating photographing unit 13 will be shut off for saving power consumption. In addition, because the processing module 20 switch the plurality of photographing units 13 automatically without manual operations, the manpower costs can be saved and the monitoring convenience can be enhanced. According to the present preferred embodiment, the center locations of the image-overlapping regions 45, 47 are used as the switching locations. This is only an embodiment of the present invention. Other locations can set as the switching locations according to the demand.

Furthermore, when the monitoring system according to the present invention starts to monitor the elevation of the bed 32, the processing module 20 can firstly activate the respective photographing units 13 sequentially for detecting the location of the bed 32 and thus determining the initially operating photographing unit 13. The initially operating photographing unit 13 starts to photograph the bed 32 and the produced image is an initial image. The processing module 20 analyzes the initial image and monitoring images produced afterwards by the photographing unit 13 to calculate the elevation variations of the bed 32. Because the locations of the plurality of photographing units 13 are fixed and known, by analyzing the location of the bed 32 on the initial image, the original elevation of the bed 32 is given. Thereby, according to the original elevation and the given elevation, the elevation variations of the bed 32 are calculated. When the monitoring system according to the present invention starts to monitor the bed 32, it is not required to use the initial image for calculating the original elevation. Instead, the original elevation of the bed 32 can be given by firstly using other measurement methods and then set in the processing module 20.

Besides, during the monitoring process of the monitoring system, the processing module 20 according to the present invention also records the history of switching the photographing units 13 and the history of the elevation variations of the bed 32. The processor 26 of the processing module 20 will record the history in the storage unit 27. Thereby, if the monitoring system is interrupted and monitoring is restarted, the processor 26 of the processing module 20 can deduce the current elevation of the bed 32 according to the history of the elevation variations of the bed 32. Then which photographing unit 13 is to be activated can be determined without activating all. Accordingly, power consumption is reduced and the lifetime of the power supply 29 shown in FIG. 1 is extended.

Figure 5:
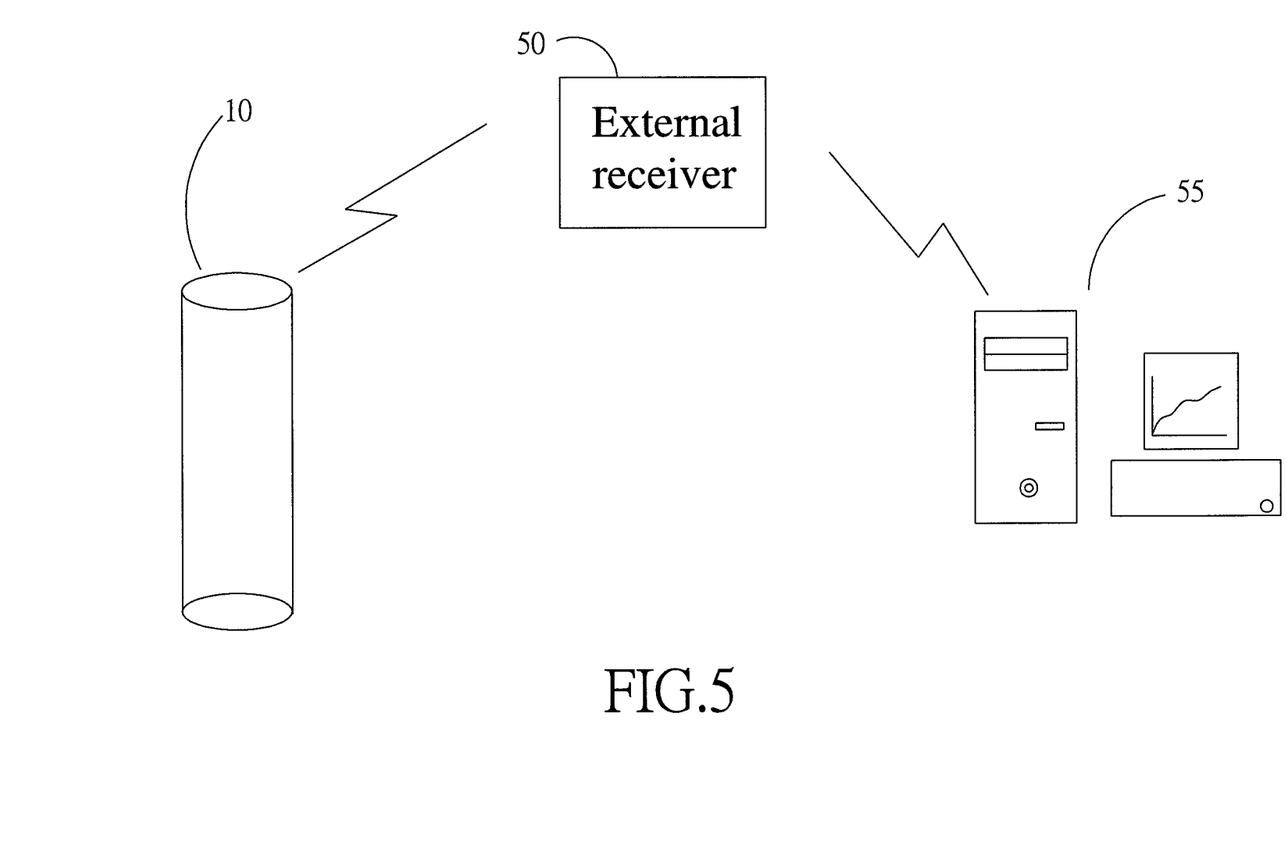
FIG. 5 shows a schematic diagram of the multi-lens monitoring system for bed elevation around a pier performing remote transmission according to a preferred embodiment of the present invention.

FIG. 5 shows a schematic diagram of the multi-lens monitoring system for bed elevation around a pier performing remote transmission according to a preferred embodiment of the present invention. As shown in the figure, the elevation variations given by the monitoring system according to the present invention will be transmitted to the remote monitoring unit 55. That is to say, the processing module 20 disposed in the container 10 transmits the elevation variation to an external receiver 50 wirelessly. Then the external receiver 50 transmits the elevation variation to the remote monitoring unit 55. Thus, the monitoring personnel can know the elevation variations of the bed 32 under water. The elevation variations can also be recorded in the remote monitoring unit 55 and forming the database for future reference as the curve of elevation variations shown on the remote monitoring unit 55 in FIG. 5. The remote monitoring unit 55 according to the present invention can be a computer or other electronic devices such as personal digital assistants (PDAs).

To sum up, multi-lens monitoring system for bed elevation around a pier according to the present invention comprises a container, a holder, a plurality of photographing units, and a processing module. The container is disposed on the pier; the holder is disposed inside the container; and the plurality of photographing units are disposed on the holder for photographing the bed under water and producing a monitoring image. The processing module is used for activating one of the plurality of photographing units for photographing the bed under water. The processing module also analyzes the monitoring image, gives the elevation variation of the bed, and transmits the elevation variation of the bed to a remote monitoring unit for real-timely monitoring and recording. Because, instead of the images, only the elevation variations of the bed is transmitted to the remote monitoring unit, the amount of the transmitted data is reduced effectively and hence the transmission bandwidth is narrowed. In addition, during the monitoring process, the processing module will change activating one of the plurality of photographing units and select the photographing unit at the proper location for photographing the bed under water. Because the processing module activates a single photographing unit for photographing the bed without the need of moving the photographing units, the electrical power can be saved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A multi-lens monitoring system for bed elevation around a pier, comprising:
 a container, disposed on said pier;
 a holder, disposed in said container;
 a plurality of photographing units, disposed on said holder, photographing a bed under water, and producing a monitoring image; and
 a processing module, activating one of said plurality of photographing units to photograph said bed under water and producing said monitoring image, analyzing said monitoring image for giving an elevation variation of said bed, transmitting said elevation variation to a remote monitoring unit, and activating one of said plurality of photographing units to photograph said bed under water according to said monitoring image.

2. The multi-lens monitoring system for bed elevation around a pier of claim 1, wherein said container has a transparent window, and one of said plurality of photographing units photographs said bed under water through said transparent window for producing said monitoring image.

3. The multi-lens monitoring system for bed elevation around a pier of claim 1, wherein said container is hermetical and is made of a waterproof material.

4. The multi-lens monitoring system for bed elevation around a pier of claim 3, wherein said waterproof material is steel.

5. The multi-lens monitoring system for bed elevation around a pier of claim 1, wherein said processing module further comprises:
 an image transmission unit, transmitting said monitoring image;
 an image extraction unit, extracting said monitoring image transmitted by said image transmission unit;
 an analog-to-digital conversion unit, coupled to said image extraction unit, and converting said monitoring image to a digital image;
 an image analysis unit, analyzing said digital image, and giving an elevation of said bed under water;
 a processor, calculating said elevation variation of said bed according to said elevation of said bed and an original elevation, and activating one of said plurality of photographing units to photograph said bed under water according to said elevation of said bed and a photographing range of each photographing unit; and
 a transmission unit, coupled to said processor, and transmitting said elevation variation to said remote monitoring unit.

6. The multi-lens monitoring system for bed elevation around a pier of claim 5, wherein said transmission unit is a wireless transmission unit or a wired transmission unit.

7. The multi-lens monitoring system for bed elevation around a pier of claim 5, wherein said processing module further comprises a storage unit, coupled to said processor, and storing system software for said processor.

8. The multi-lens monitoring system for bed elevation around a pier of claim 5, wherein said processing module further comprises a switching unit, coupled to said plurality of photographing units, and switching said plurality of photographing unit according to a switching signal produced by said processor for activating one of said plurality of photographing units to produce said monitoring image and transmit said monitoring image to said analog-to-digital conversion unit.

9. The multi-lens monitoring system for bed elevation around a pier of claim 1, wherein one of said plurality of photographing units extracts an initial image; said processing module analyzes said initial image and said monitoring image and gives said elevation variation of said bed; and said processing module activates one of said plurality of photographing units to photograph said bed under water according to said monitoring image and a photographing range of each photographing unit.

10. The multi-lens monitoring system for bed elevation around a pier of claim 1, wherein said holder has at least a lighting unit.

11. The multi-lens monitoring system for bed elevation around a pier of claim 1, and further comprising a power supply, supplying power to said plurality of photographing units and said processing module.

12. The multi-lens monitoring system for bed elevation around a pier of claim 1, and further comprising a scale, disposed in said container.

* * * * *